US009296370B2

(12) United States Patent
McClain et al.

(10) Patent No.: US 9,296,370 B2
(45) Date of Patent: Mar. 29, 2016

(54) HYDRAULIC AND ELECTRONIC BRAKING SYSTEM FOR AUTONOMOUS BRAKING

(71) Applicant: Continental Automotive Systems, Inc., Auburn Hills, MI (US)

(72) Inventors: Jeremy Jason McClain, Oxford, MI (US); Geoff Bauer, Oxford, MI (US); Joerg Scheibel, Lake Orion, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 14/560,326

(22) Filed: Dec. 4, 2014

(65) Prior Publication Data

US 2015/0151726 A1 Jun. 4, 2015

Related U.S. Application Data

(60) Provisional application No. 61/911,810, filed on Dec. 4, 2013.

(51) Int. Cl.
| | |
|---|---|
| *B60T 13/74* | (2006.01) |
| *B60T 7/04* | (2006.01) |
| *B60T 8/32* | (2006.01) |
| *B60T 8/92* | (2006.01) |

(52) U.S. Cl.
CPC .............. *B60T 7/042* (2013.01); *B60T 8/321* (2013.01); *B60T 8/326* (2013.01); *B60T 8/92* (2013.01); *B60T 2270/413* (2013.01); *B60T 2270/82* (2013.01)

(58) Field of Classification Search
CPC ........... B60T 8/17; B60T 7/042; B60T 13/14; B60T 13/58; B60T 13/74; B60T 11/00; B60T 11/16; B60T 8/171; B60T 8/176; B60T 8/408; B60T 8/442

USPC ....... 303/9.61, 9.62, 114.1, 114.3; 188/106 F, 188/106 P, 345
See application file for complete search history.

(56) References Cited

U.S. PATENT DOCUMENTS

| | | | | |
|---|---|---|---|---|
| 4,547,967 A * | 10/1985 | Reynolds | ................ | B60T 11/10 180/6.2 |
| 4,702,330 A * | 10/1987 | Vatter | ................... | B62D 11/08 180/6.2 |
| 5,971,499 A * | 10/1999 | Pape | ......................... | B62L 1/00 188/345 |
| 6,227,628 B1 * | 5/2001 | Emmann | ............... | B60T 11/224 303/114.1 |
| 6,616,246 B1 * | 9/2003 | Williamson | ............ | B60T 13/12 188/345 |
| 8,177,306 B2 * | 5/2012 | Cadeddu | ................. | B60T 11/20 188/345 |
| 9,061,673 B2 * | 6/2015 | Weiberle | ................. | B60T 7/042 |
| 9,090,239 B2 * | 7/2015 | Mamei | ..................... | B60T 11/21 |
| 2009/0091180 A1 * | 4/2009 | Iwasaki | ................... | B60T 8/171 303/11 |
| 2013/0062932 A1 * | 3/2013 | Yagashira | ............... | B60T 8/442 303/3 |

* cited by examiner

*Primary Examiner* — Christopher Schwartz

(57) ABSTRACT

A brake system for a motor vehicle includes a first control module coupled to a first hydraulic brake circuit and a second hydraulic brake circuit. The first control module is configured to control fluid pressure within both the first hydraulic brake circuit and the second hydraulic brake circuit. A second control module coupled to the first hydraulic brake circuit and the second hydraulic brake circuit, wherein the second control module is configured to control fluid pressure within both the first hydraulic brake circuit and the second hydraulic brake circuit independent of the first control module. The first control module is disposed in series with the second control module in the first hydraulic brake circuit and the second hydraulic brake circuit.

18 Claims, 3 Drawing Sheets

HYDRAULIC AND ELECTRONIC BRAKING SYSTEM FOR AUTONOMOUS BRAKING

CROSS REFERENCE TO RELATED APPLICATION

This application claims priority to U.S. Provisional Application No. 61/911,810 filed on Dec. 4, 2013.

BACKGROUND

This disclosure generally relates to a braking system for a motor vehicle. More particularly, this disclosure relates to an autonomous fully by-wire braking system for a motor vehicle.

Braking systems for a motor vehicle generally include a hydraulic circuit that actuates wheel cylinders to impart braking torque. Conventional braking systems are actuated responsive to action by a vehicle operator. Advanced vehicle systems integrate various levels of autonomous control to actuate systems independent of operator inputs. Such autonomous systems utilize information indicative of vehicle speed, acceleration, direction, and location as a prompt to engage vehicle systems without or in addition to input from a vehicle operator. Autonomous actuation of a vehicle braking system is prompted based on predetermined algorithms and triggers from various vehicle sensors.

SUMMARY

A brake system according to an exemplary embodiment of this disclosure, among other possible things includes, a first brake set and second brake, a first hydraulic brake circuit connected to the first brake set, a second hydraulic brake circuit connected to the second brake set and a first control module coupled to the first hydraulic brake circuit and the second hydraulic brake circuit. The first control module is configured to control fluid pressure within both the first hydraulic brake circuit and the second hydraulic brake circuit. A second control module is coupled to the first hydraulic brake circuit and the second hydraulic brake circuit and is configured to control fluid pressure within both the first hydraulic brake circuit and the second hydraulic brake circuit independent of the first control module. The first control module is disposed in series with the second control module in the first hydraulic brake circuit and the second hydraulic brake circuit.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
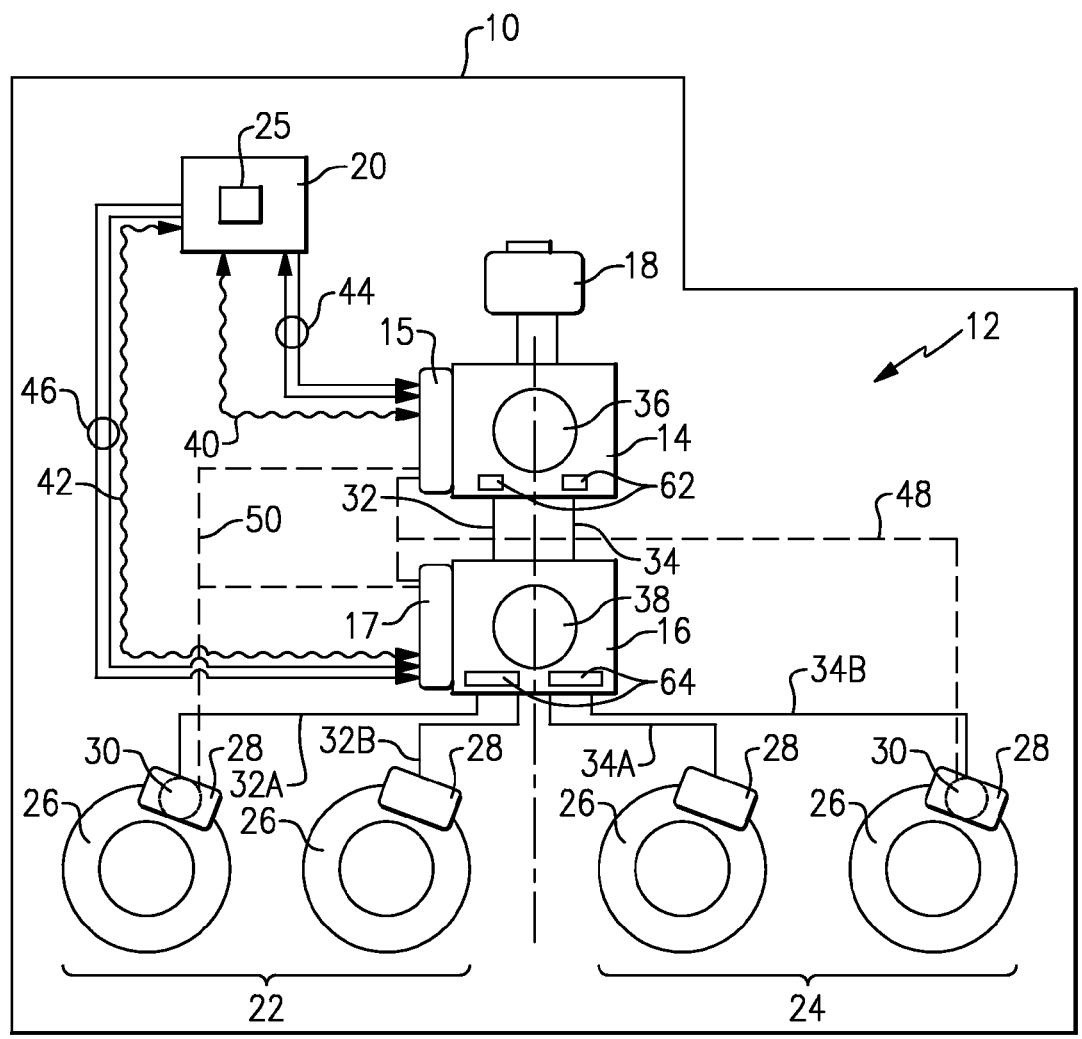
FIG. 1 is a schematic view of an example vehicle braking system.

Referring to FIG. 1, a by-wire braking system 12 for a motor vehicle 10 (Shown schematically) includes independent brake control modules (BCM) that each are configured to provide braking pressure within a first brake circuit 22 and a second brake circuit 24. The disclosed system 12 may provide a fully by-wire braking system controlled by a controller 20 independent or in combination with input from a vehicle operator.

The example braking system 12, includes a first or Upstream Brake Control Module 14 (UBCM) and a second or Downstream Brake Control Module 16 (DBCM). Each of the UBCM 14 and the DBCM 16 work hydraulically in series to provide hydraulic brake pressure and vehicle stability functions. The brake system 12 provides redundant hardware and software to ensure base braking performance in the presence of single point failures and without any mechanical interface to the driver.

The UBCM 14 and DBCM 16 work independently of one another to build hydraulic brake pressure. The UBCM 14 and DBCM 16 are plumbed hydraulically in series with one another. The disclosed brake system 12 includes a reservoir 18 that provides brake fluid to the first brake circuit 22 and the second brake circuit 24. The example reservoir 18 contains two fluid chambers (one for each hydraulic circuit 22 and 24) or may also be configured as two independent reservoirs.

A wheel brake 28 is disposed at each wheel of the vehicle and actuates against a rotor 26. In this disclosed example, the wheel brake 28 is a caliper that exerts a braking torque on the rotor 26. It should be understood that other wheel brake configurations may also be utilized within the contemplation of the disclosed brake system 12.

The UBCM 14 includes a first pump 36 and the DBCM 16 includes a second pump 38 that are controlled to provide the desired pressure to control activation of wheel brakes 28. Each of the first pump 36 and the second pump 38 are hydraulically coupled by valves 62, 64 to each of the hydraulic circuits 22, 24 that enable hydraulic flow with each hydraulic circuit 22, 24 independently and/or in any desired combination. Pressure increases and control are the result of an activation of a corresponding one of the first and second pumps 36, 38. The UBCM 14 is disposed upstream of the DBCM 16 within each of the first and second brake circuits 22, 24. Brake fluid is provided by the reservoir 18 to both the brake circuits 22, 24 and flows through the UBCM 14 to the DBCM 16 such that the UBCM 14 pushes brake fluid through the DBCM 16 when hydraulic pressure control is provided by the UBCM 14 and the DBCM 16 draws fluid through the UBCM 14 when the DBCM 14 is providing hydraulic pressure control. The fluid reservoir 18 may also be arranged such that each of the DBCM 16 and the UBCM 14 draw fluid directly from the fluid reservoir 18, separate and independent of each other.

The UBCM 14 contains at least one electronic control unit (ECU) 15, an electrical power supply, one or more data connections or analog/digital inputs/outputs 40, at least one hydraulic pump 36 and multiple electromechanical hydraulic valves 62 for each of two hydraulic circuits 22, 24. The hydraulic path through the UBCM 14 is normally open.

The DBCM 16 contains at least one ECU 17, an electrical power supply, one or more data connections or analog/digital inputs/outputs 42, at least one hydraulic pump 38 and multiple electromechanical hydraulic valves 64 for each of four hydraulic lines 32a, 32b, 34a and 34b circuits which are connected to the wheel brakes 28. The hydraulic path through the DBCM 16 is normally open.

An electronic Integrated Parking Brake (eIPB) caliper 30 is provided with at least one of the wheel brakes 28. In this example an eIPB caliper 30 is provided in each of the first and second brake circuits 22, 24. The eIPB calipers 30 electromechanically apply and lock to hold brake torque in the wheel brake 28 for parking situations. The eIPBs 30 may also be used in hydraulic failure situations to apply brake torque independent from the first and second hydraulic circuits 22, 24.

Both the UBCM 14 and the DBCM 16 of the brake system 12 are in communication with the corresponding eIPBs 30 through a first communication link 50 and a second communication link 48. Accordingly, each of the UBCM 14 and the DBCM 16 are capable of controlling the eIPBs 30 independently from one another. The example eIPBs 30 are configured as "normally open" such that in the absence of electric actuation, the eIPBs 30 do not apply a brake pressure to the corresponding wheel.

Each of the UBCM 14 and the DBCM 16 are in independent electrical and data communication with a controller 20. The UBCM 14 communicates through a first data interface 40 and is powered through a first power connection 44 with the controller 20. The DBCM 16 communicates through a second data interface 42 and is powered through a second power connection 46 with the controller 20. The example controller 20 can be part of the vehicle control module or a separate control module for operation of the brake system 12. The controller 20 provides information indicative of vehicle operations utilized for determination of proper brake actuation operation. The controller 20 may provide information indicative of vehicle operation for use by the UBCM 14, and DBCM 16 to determine suitable and desired braking actuation. Moreover, the controller 20 may provide specific commands that are required to implement a desired braking operation.

The system 12 includes a logic unit 25 that assesses the operating state of the braking system 12 and activates a redundant braking action. A redundant braking action can include actuation of a braking circuit that is not compromised, actuation of the eIPB caliper 30 or a combination of the actuation of the remaining functional portions of the braking system 12. The disclosed logic unit 25 is part of the controller 20, but may be contained in the UBCM 14, DBCM 16, ECU 15, ECU 17 and/or elsewhere in the system 12. Moreover, the logic unit 25 may be provided in some part across several units to provide further redundancy to assure operation of the braking system 12 in the event of a single point failure. The logic unit 25 may assess the operating state directly via the reported state(s) of the ECUs 15, 17, and controller 20 in the system 12. The logic unit 25 may also detect an operating state of the braking system indirectly through plausibility checks of the vehicles deceleration behavior as compared to an expected behavior based on the systems 12 actuation state.

Each of the UBCM 14 and the DBCM 16 are hydraulically coupled to the first and second hydraulic circuits 22, 24. The first hydraulic circuit 22 includes hydraulic line 32 that provides a fluid passage from the reservoir 18 through the UBCM 14 and through the DBCM 16. The line 32 then splits into separate lines 32A and 32B to corresponding wheel brakes 28. The second hydraulic circuit 24 includes hydraulic line 34 that communicates brake fluid from the reservoir 18 to and through the UBCM 14 through the DBCM 16. In another configuration of the system the hydraulic connection through the DBCM 16 may connect only 2 wheel brakes 28 (one on each circuit) and the other 2 wheel brakes 28 may be connected only to the UBCM 14. In such cases, the wheel brakes 28 connected to the UBCM 14 would be the eIPB calipers 30 to enable electromechanical braking in case of UBCM 14 hydraulic failure.

Accordingly, the UBCM 14 and the DBCM 16 share hydraulic interfaces as well as the hydraulic fluid reservoir 18. The example brake system 12 includes the two independent hydraulic circuits 22, 24, which each supply half of the wheel brakes 28. Both the hydraulic circuits 22, 24 operate through identical and separated systems within each of the UBCM 14 and the DBCM 16. Within or after the DBCM 16, each of the two circuits 22 and 24 supply one half of the wheel brakes 28. The two brake circuits 22,24 can be split between front and rear axles or crosswise with one wheel brake 28 being part of the front axle and another wheel brake in the same system being part of the rear axle.

In the case of any single point electrical or communication failures in one of the BCMs 14, 16 the other BCM 14, 16 is able to apply hydraulic brake pressure to the wheel brakes 28. In the case of any single point hydraulic failure, the other hydraulic circuit of the brake system 12 provides a redundant hydraulic circuit capable of applying hydraulic pressure to half of the wheel brakes 28 due to the independent hydraulic circuits 22, 24. At least one of the UBCM 14 and the DBCM 16 is capable to perform vehicle braking control functions such as anti-lock braking, traction control, electronic braking distributing, anti-rollover control and yaw control.

The disclosed brake system 12 is operable with or without a brake pedal or driver input switch (an example is an emergency braking switch). If a brake pedal (or other input device) is optionally installed, the example braking system 12 can work with or without a mechanical or hydraulic connection from the brake pedal to the wheel brakes. The brake system can use a brake pedal sensor or any analog or digital communication signal to command the amount of deceleration requested by the driver or other control device. In addition, or alternatively, the brake system 12 can operate autonomously without input from a vehicle operator.

Figure 2:
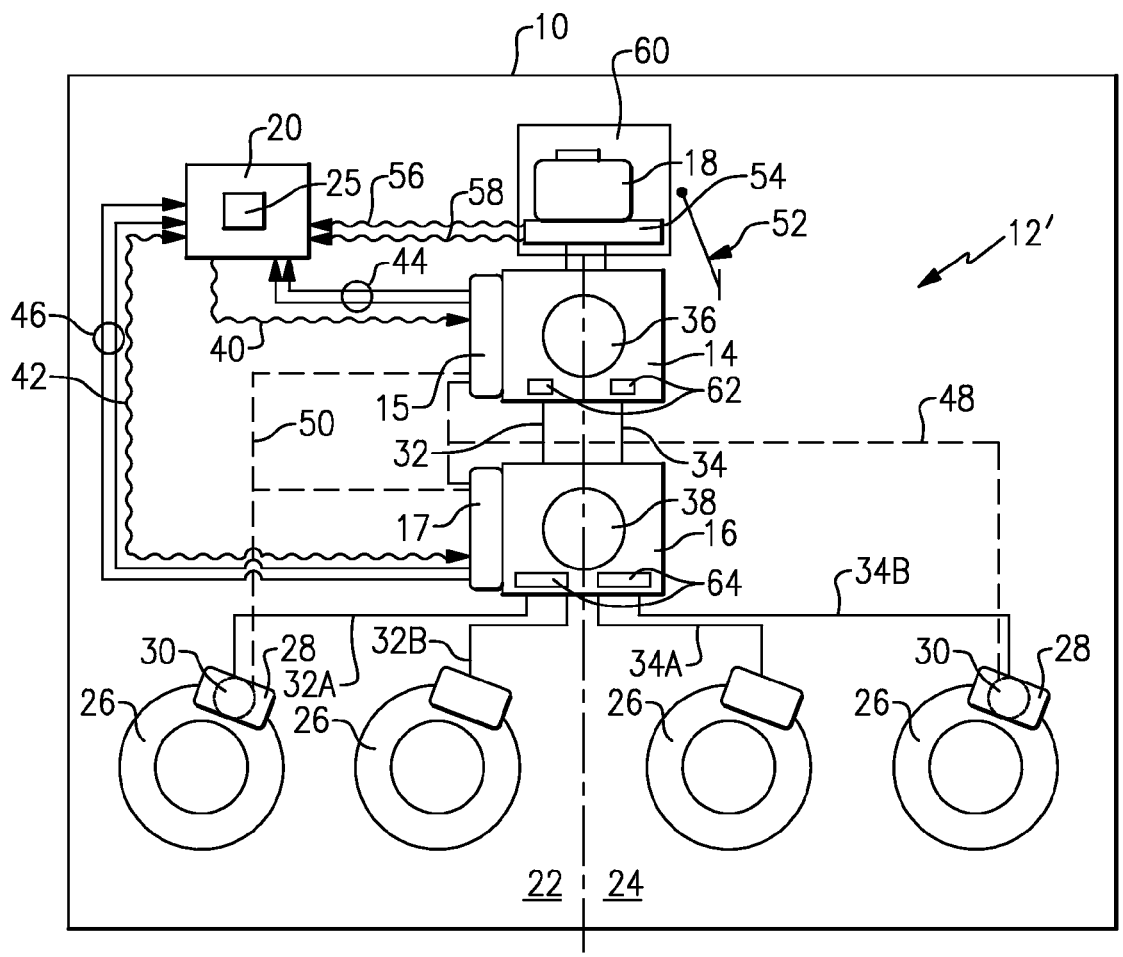
FIG. 2 is a schematic view of another vehicle braking system.

Referring to FIG. 2, another braking system 12' includes a driver actuated braking mechanism in the form of a traditional brake pedal 52 and master cylinder assembly 60. Brake pedal 52 and master cylinder assembly 60 translates driver input to hydraulic pressure in the first and second brake circuits 22, 24. A travel sensor 54 is provided for sensing the travel of the brake pedal 52 to provide a braking signal to the controller 20 through data first and second data connections 56, 58. Each data connection corresponds with a separate one of the UBCM 14 and the DBCM 16 to provide a separate and redundant communications link. Although the pedal 52 is illustrated, the driver actuated braking mechanism can also be in the form of a button, or the like, that can be actuated by the driver or a vehicle occupant in vehicles where autonomous operation is performed such that the vehicle does not include a driver in the traditional understanding.

Figure 3:
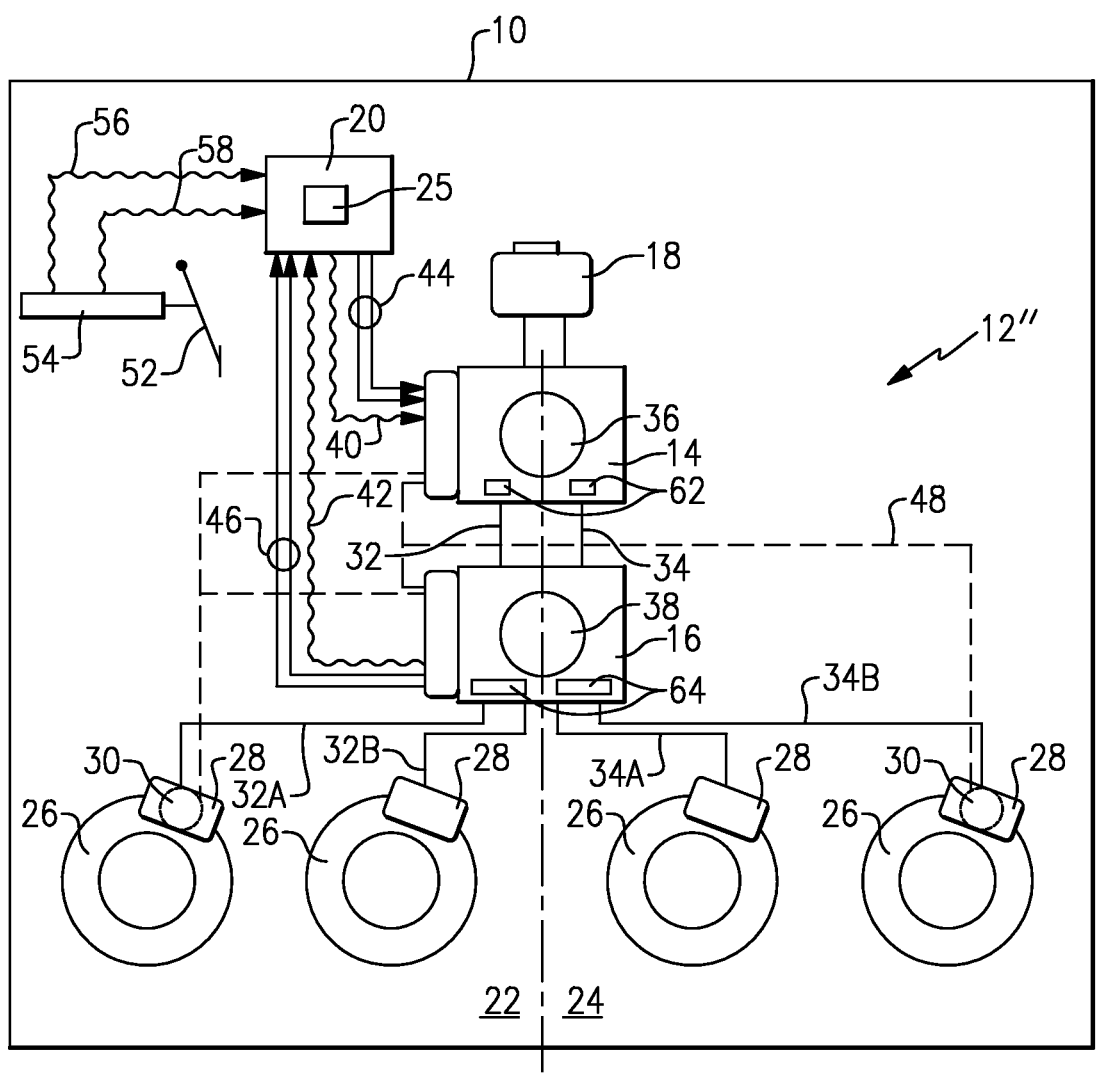
FIG. 3 is a schematic view of yet another example braking system.

Referring to FIG. 3, another brake system 12" includes the brake pedal 52 and travel sensor 54. The brake pedal 52 provides an input to the pedal travel sensor 54 that is communicated to the controller 20 and utilized to determine a desired braking operation. The sensor 58 generates a signal indicative of the driver's input request and communicates this to the controller 20 and brake system 12" through the data connections 56, 58. In this example, the brake pedal 52 and travel sensor 58 is independent of any hydraulic or mechanical coupling to the braking system 12" resulting in a braking "by-wire" configuration.

The disclosed braking systems 12' and 12" illustrated in FIGS. 2 and 3 include provision for driver actuated braking command in the form of a driver actuated braking mechanism, in either case, the deceleration or other braking request to the system may or may not come from the driver or other vehicle occupant, as the braking command can still come from the autonomous vehicle system.

The two BCMs 14, 16 provides redundancy without the need for vacuum in the vehicle (as used in conventional vacuum assisted power braking systems). For example, the braking system 12 can also use redundant pump motor coils in the hydraulic pumps and redundant control circuits or redundant ECUs to control pump circuits independently. In another example, the braking system 12 can use a plunger type pressure actuator as a primary hydraulic pressure source and a BCM for redundancy. In another example, the braking system 12 can use non-hydraulic brake actuators (i.e. electromechanical brake actuators, or "EMB") with two electrical circuits and two ECUs. In another example, the system can use a combination of one BCM and one EMB with independent electrical circuits and ECUs.

Referring back to FIG. 1, a disclosed method for operating the braking system 12 includes receiving a braking signal to provide brake pressure at one or both of the UBCM 14, and DBCM 16. The signal may originate from the controller 20 as a result of a determination made based on vehicle operation autonomous of driver input, or from driver input or a combination of driver input and autonomous operation. In response to receiving the braking signal, one or both of the corresponding pumps 36, 38 of the UBCM 14 and DBCM 16 are actuated. In response to actuating one or both of the pumps 36, 38, the hydraulic fluid contained in the reservoir 18 will exert a hydraulic pressure through the hydraulic brake lines 32, 34 of the brake circuits 22 and 24 through both the UBCM 14 and DBCM 16 and toward the wheel brakes 28.

In one disclosed embodiment, both the UBCM 14 and DBCM 16 receive the braking signal and both of the corresponding pumps 36, 38 are actuated. However, in the event of a fault at one of the BCMs 14 and 16, the series connection of the UBCM 14 and DBCM 16 provided by the plurality of valves 62, 64 and corresponding pumps 36, 38 will result in hydraulic fluid at a desired pressure being delivered through both of the hydraulic brake circuits 22 and 24.

In one disclosed embodiment, fluid pressure is communicated through both of the hydraulic brake circuits 22 and 24 such that all of the wheel brakes 28 are actuated. However, in the event of a hydraulic fluid leak, blockage, or other fault in one of the brake circuits 22, 24, the redundant configuration of the two brake circuits 22, 24 provides fluid pressure communication being delivered through both the UBCM 14 and the DBCM 16 to half of the wheel brakes 28 disposed on the undamaged brake circuit Although an embodiment of this disclosure has been disclosed, a worker of ordinary skill in this art would recognize that certain modifications would come within the scope of this disclosure

What is claimed is:

1. A brake system for a motor vehicle comprising:
a first brake set and second brake set;
a first hydraulic brake circuit connected to the first brake set;
a second hydraulic brake circuit connected to the second brake set;
a first control module coupled to the first hydraulic brake circuit and the second hydraulic brake circuit, wherein the first control module is configured to control fluid pressure within both the first hydraulic brake circuit and the second hydraulic brake circuit; and
a second control module coupled to the first hydraulic brake circuit and the second hydraulic brake circuit, wherein the second control module is configured to control fluid pressure within both the first hydraulic brake circuit and the second hydraulic brake circuit independent of the first control module, wherein the first control module is disposed in series with the second control module in the first hydraulic brake circuit and the second hydraulic brake circuit.

2. The brake system for a motor vehicle as recited in claim 1, wherein the first brake control module includes a first hydraulic pump coupled to at least one of the first hydraulic circuit and the second hydraulic circuit and the second brake control module includes a second hydraulic pump coupled to at least one of the first hydraulic circuit and the second hydraulic circuit, wherein each of the first hydraulic pump and the second hydraulic pump are independently operable to control fluid pressure in each of the first hydraulic circuit and the second hydraulic circuit.

3. The brake system for a motor vehicle as recited in claim 1, including a logic unit configured for assessing an operating state of the braking system and activating a redundant braking action in response to detection of a predefined condition of the braking system.

4. The brake system for a motor vehicle as recited in claim 1, wherein each of the first brake set and the second brake set comprise a plurality of wheel brakes.

5. The brake system for a motor vehicle as recited in claim 4, wherein at least one of the wheel brakes includes an integrated parking brake electronically coupled to each of the first control module and the second control module such that the integrated parking brake is actuatable by both of the first control module and the second control module.

6. The brake system for a motor vehicle as recited in claim 1, wherein each of the first control module and the second control module include separate power and data inputs.

7. The brake system for a motor vehicle as recited in claim 1, wherein fluid pressure within each of the first hydraulic system and the second hydraulic system is controlled by only one of the first control module and the second control module.

8. The brake system for a motor vehicle as recited in claim 7, wherein a one of the first control module and the second control module not controlling pressure is open to fluid flow therethrough as controlled by the one of the first and second control modules controlling pressure.

9. The brake system for a motor vehicle as recited in claim 1, including a fluid reservoir in fluid communication with both the first hydraulic circuit and the second hydraulic circuit.

10. The brake system for a motor vehicle as recited in claim 9, wherein the second control module is downstream of the first control module in both the first hydraulic circuit and the second hydraulic circuit, and the first control module is disposed between the reservoir and the second control module.

11. The brake system for a motor vehicle as recited in claim 10, wherein brake pressure is actuatable by both the first control module and the second control module, the first control module draws brake fluid from a reservoir and pumps the brake fluid through the second control module, and the second control module draws brake fluid through the first control module and pumps brake fluid through at least one of the first and second brake circuits.

12. The brake system for a motor vehicle as recited in claim 1, wherein the one of the first control module and the second control module not actuating brake pressure operates as a pass through for the brake fluid.

13. The brake system for a motor vehicle as recited in claim 1, including a driver actuated braking mechanism configured to provide a braking signal communicated to each of the first control module and the second control module.

14. The brake system for a motor vehicle as recited in claim 13, wherein the driver actuated braking mechanism comprises a brake pedal and hydraulic master cylinder coupled to the first and second braking circuits.

15. A method of operating a vehicle braking system comprising:
configuring a first control module coupled to a first hydraulic brake circuit and a second hydraulic brake circuit, wherein the first control module is configured to control fluid pressure within both the first hydraulic brake circuit and the second hydraulic brake circuit; configuring a second control module coupled to the first hydraulic brake circuit and the second hydraulic brake circuit, and the second control module is disposed in series with the first control module in the first hydraulic brake circuit and the second hydraulic brake circuit; and
controlling fluid pressure with one of the first control module and the second control module within both the first hydraulic brake circuit and the second hydraulic brake circuit independent of the other of the first control module and the second control module.

16. The method as recited in claim 15, including freely flowing brake fluid through the one of the first control module and the second control module not controlling fluid pressure within one of the first brake circuit and the second brake circuit.

17. The method as recited in claim 15, including controlling brake pressure with one of the first control module and the second control module such that when the first control module draws brake fluid from a reservoir and pumps the brake fluid through the second control module when controlling brake pressure, and the second control module draws brake fluid through the first control module and pumps brake fluid through at least one of the first and second brake circuits when controlling brake pressure.

18. The method as recited in claim 15, including assessing an operating state of the braking system with a logic unit and activating a redundant braking action in response to detection of a predefined condition of the braking system.

* * * * *